Sept. 29, 1936.     F. SCHONGER     2,055,912
COMBINED BAIT PAIL AND MINNOW TRAP
Filed April 27, 1935
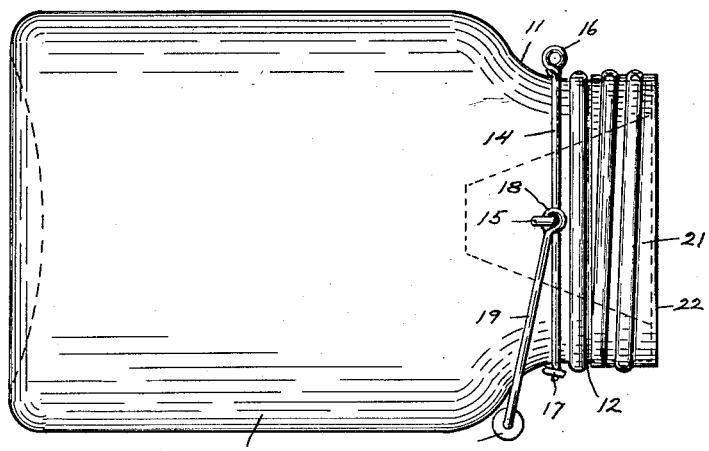
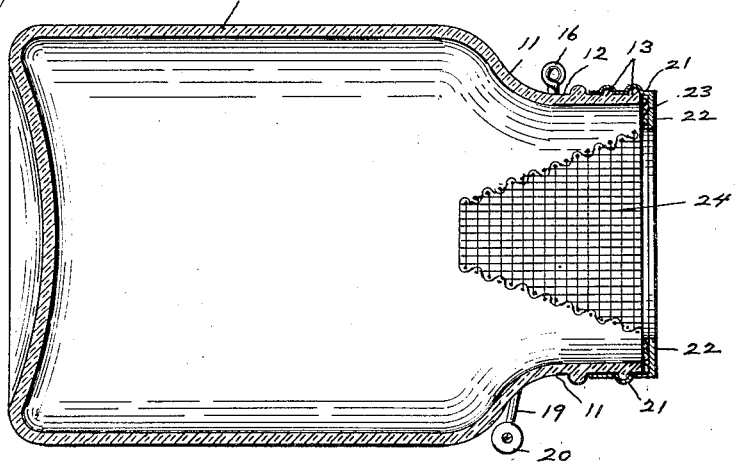
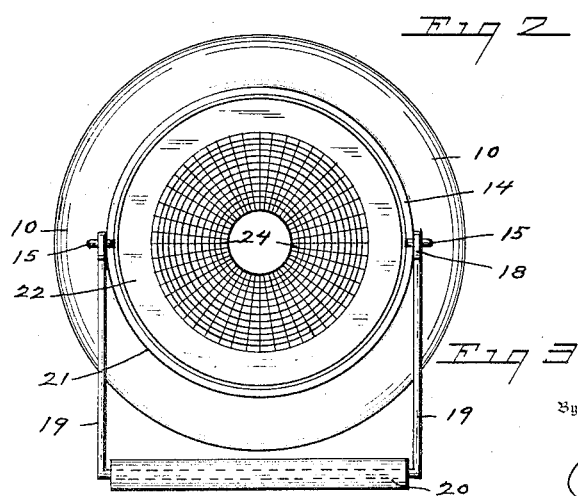
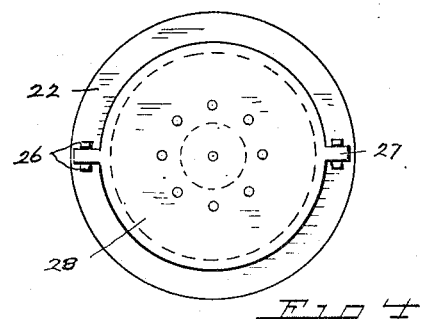
Inventor
Frank Schonger.
Attorney Patented Sept. 29, 1936

2,055,912

UNITED STATES PATENT OFFICE 2,055,912

COMBINED BAIT PAIL AND MINNOW TRAP

Frank Schonger, Kerhonkson, N. Y.

Application April 27, 1935, Serial No. 18,494

1 Claim. (Cl. 43—56)

This invention relates to a combined bait pail and minnow trap of that class employed by sportsmen in fishing, for catching live bait and holding the same until desired for use, and it relates more particularly to an article of this class which may be readily transported from place to place without injury to the bait.

While I am aware that such articles have been made, they are either constructed of metal which not only makes them dark preventing the fish from entering the trap, but also prevents the contents from being seen, or they are constructed from glass with a solid metal funnel-shaped opening which prevents the draining off of the water without first removing the funnel.

I have overcome these objections in my novel construction which comprises a container of transparent material, such as glass, and which is provided with a funnel-shaped cap of wire gauze through which the water may be drained off without liberating the fish from the pail.

The object of the invention is to provide a combined bait pail and fish trap, which shall be cheap, durable and efficient, light in weight, easily carried and providing a storage space for fishing tackle when not in use as a bait pail.

Another object of the invention is to provide in a device of this kind, means whereby the same may be placed in proper position as a fish trap and prevented from rolling or other movement.

Another object of the invention is to provide a bait trap in which the body or container is nearly the same color as the water and being transparent does not scare the fish from entering the same.

Another object of the invention is to provide a bait pail in which the trap end is constructed of wire mesh or gauze having an opening through which the fish pass in entering the trap, the mesh allowing the water to be poured out of the container without liberating the fish.

Another object of the invention is to provide means whereby the funnel-shaped cap may be readily removed from the container to give access to the bait when desired for use.

Another object of the invention is to provide means for transporting the device from place to place without danger of losing either the bait or the water contained therein.

Another object of the invention is to provide means whereby the funnel-shaped cap may be closed if so desired.

With these and other objects in view, my invention consists in certain novel construction and combination of parts as will hereinafter be fully described and claimed, and further illustrated in the accompanying drawing which forms a part hereof and in which like figures of reference refer to corresponding parts in all of the views, and it is understood that slight changes may be made without departing from the spirit of the invention.

In the drawing:

Figure 1 shows a side elevation of the device in position for use as a fish trap.

Figure 2 is a longitudinal sectional view of the same, showing the construction and combination of parts.

Figure 3 shows an end view looking into the funnel-shaped cap.

Figure 4 shows the same end with the addition of a detachable cover for the opening.

Referring to the drawing:

The device comprises a jar or container 10 of transparent material such as glass and which is formed with one closed end integral with the sides, a neck 11 and a collar 12 formed with a thread or threads 13.

Secured around the neck 11 is a wire or band 14 which is formed with the two opposite spaced eyes 15, and an eye or loop 16 to which may be attached a line; the ends of the band 14 being secured together by twisting as at 17.

Within the eyes 15 are secured the looped ends 18 of a bail handle 19 which is provided with the hand grip 20; this handle 19 being adapted to be swung under the container 10 to act as a support to prevent turning when the same is placed in the bed of the stream for use as a bait trap.

The collar 12 which is formed with one or more threads, may if desired, in place of the threads 13 be formed with a beading or other means for detachably securing thereon a cap 21, which in this case is formed with corresponding threads.

This cap 21 is formed with a central opening leaving a narrow rim 22, to the inner face of which is attached by some suitable means such as solder the flanged edge 23 of a funnel 24 constructed from a metal mesh or gauze material with the inlet opening through which the bait enters the trap in the usual manner, the container 10 being transparent, and being not only filled with water, but submerged under the water presents no obstruction to the bait which will not observe the wall of glass, as they would if the container were of opaque material shutting out the light.

Should it be desired to do so, the cap 21 may be provided with two U-shaped clips 26 for retaining in a detachable manner the clips 27 formed on the opposite sides of a cover plate 28, which may be used for covering the opening to the funnel.

As before stated, in place of the threads for holding the cap on the container, other means may be employed, and should the container break, another can be readily used with the same cover and funnel without having to replace the entire article as is the case where the container and funnel are of the same material and in one piece.

Having thus described my invention, what I claim as new and desire to secure by Letters Patent, is:

In a combined bait and minnow trap of the class described, the combination of a transparent cylindrical container formed with a neck portion and an open end, a threaded collar integral with said neck, an annular ring adapted to be threaded thereon, a flange formed on said ring, a wire mesh funnel secured to the inner face of said flange and projecting into the container, clips formed on the opposite face of said flange, and a cover plate detachably secured within said clips to cover the open end of both the ring and the container.

FRANK SCHONGER.